(12) United States Patent
Katou

(10) Patent No.: US 8,269,896 B2
(45) Date of Patent: Sep. 18, 2012

(54) ERROR DETECTION METHOD AND CIRCUIT, AND ERROR REDUCTION METHOD AND CIRCUIT

(75) Inventor: Takashi Katou, Kawasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 651 days.

(21) Appl. No.: 12/429,608

(22) Filed: Apr. 24, 2009

(65) Prior Publication Data

US 2009/0278990 A1   Nov. 12, 2009

(30) Foreign Application Priority Data

May 7, 2008   (JP) .................................. 2008-121278

(51) Int. Cl.
*H04N 5/00* (2011.01)

(52) U.S. Cl. ........ 348/624; 348/659; 348/601; 348/345; 348/603; 348/605; 348/631; 348/362; 348/453; 348/665; 348/666; 341/105; 345/605

(58) Field of Classification Search .................. 348/624, 348/659, 601, 345, 603, 605, 631, 362, 453, 348/665, 666; 341/105; 345/605
See application file for complete search history.

(56) References Cited

U.S. PATENT DOCUMENTS

| 5,442,406 | A * | 8/1995 | Altmanshofer et al. | 348/588 |
|---|---|---|---|---|
| 5,523,798 | A * | 6/1996 | Hagino et al. | 348/665 |
| 6,809,765 | B1 * | 10/2004 | Tao | 348/273 |
| 7,362,897 | B2 * | 4/2008 | Ishiga | 382/167 |
| 2002/0158977 | A1 * | 10/2002 | Hamilton, Jr. | 348/246 |
| 2004/0057467 | A1 | 3/2004 | Adams | |
| 2005/0030422 | A1 * | 2/2005 | Leone et al. | 348/441 |
| 2006/0187357 | A1 * | 8/2006 | Satou et al. | 348/631 |
| 2007/0040944 | A1 * | 2/2007 | Hong | 348/624 |
| 2007/0139547 | A1 * | 6/2007 | Horiuchi | 348/362 |
| 2008/0056386 | A1 | 3/2008 | Adams | |
| 2009/0079867 | A1 * | 3/2009 | Leone et al. | 348/453 |
| 2009/0231487 | A1 * | 9/2009 | Nakagawa et al. | 348/453 |

FOREIGN PATENT DOCUMENTS

JP   2006-500823 A   1/2006

OTHER PUBLICATIONS

Japanese Office Action mailed Mar. 27, 2012 in corresponding Japanese patent application No. 2008-121278.

* cited by examiner

*Primary Examiner* — Jefferey Harold
*Assistant Examiner* — Mustafizur Rahman
(74) *Attorney, Agent, or Firm* — Sughrue Mion, PLLC (57) ABSTRACT

An error reduction apparatus includes a combing absence detector to detect absence of combing from a luminance signal, a combing presence detector to detect presence of combing from a color-difference signal, a vertical low-pass filter to receive the color-difference signal, and a selector to select one of the color-difference signal and a color-difference signal to which the vertical low-pass filter is applied based on detection results of the combing absence detector and the combing presence detector, and if combing is absent in the luminance signal and combing is present in the color-difference signal, the error reduction apparatus applies the vertical low-pass filter to the color-difference signal and outputs the signal.

6 Claims, 9 Drawing Sheets

CUE DOES NOT OCCUR IF IP CONVERSION→UPSAMPLING

ERROR DETECTION METHOD AND CIRCUIT, AND ERROR REDUCTION METHOD AND CIRCUIT

BACKGROUND

1. Field of the Invention

The present invention relates to an error detection method and circuit that detect chroma upsampling error and an error reduction method and circuit that detect and reduce chroma up-sampling error.

2. Description of Related Art

Figure 7:
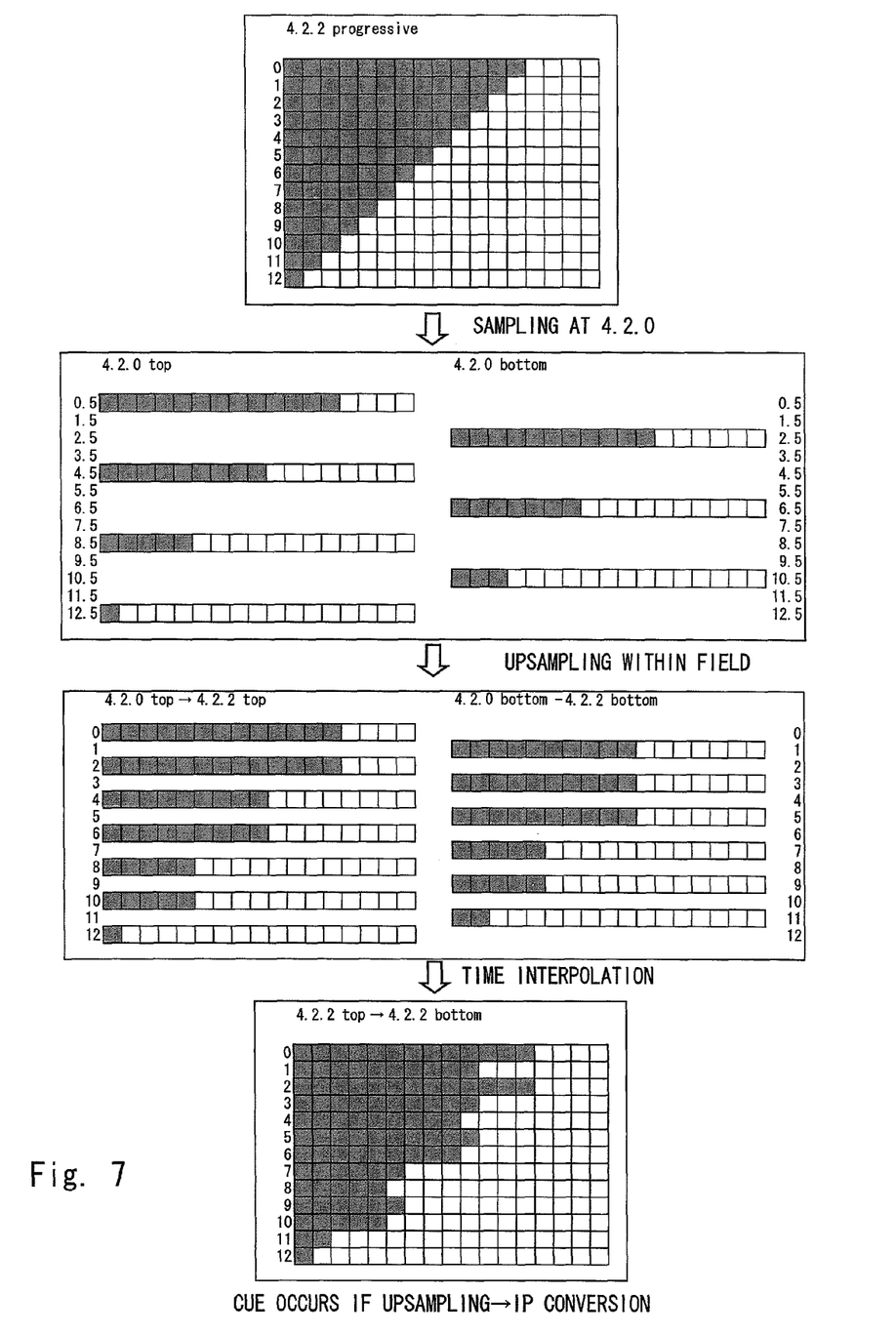
FIG. 7 is a view showing chroma upsampling error.

FIG. 7 is a view showing an artifact (data error or signal distortion) called chroma upsampling error (CUE). The chroma upsampling error is an error that, because the information amount of a color signal is small with the DVD specifications, color information appears only in every other line if the signal is simply converted into progressive, and particularly, a plane solidly filled with pure red or the like appears like a lattice.

Figure 8:
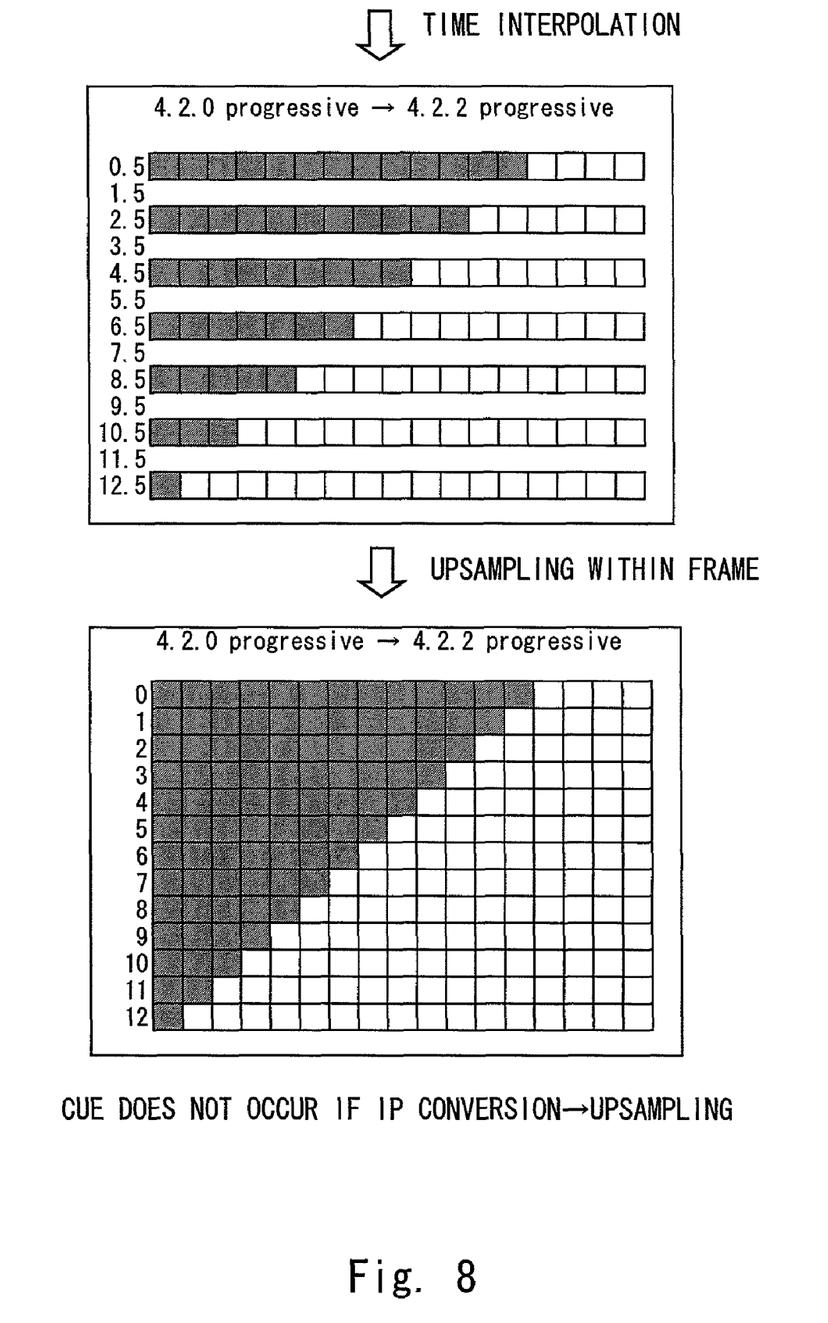
FIG. 8 is a view showing the case of performing normal upsampling.

As shown in FIG. 7, if a vertically down-sampled interlaced color-difference signal is mistakenly vertically up-sampled and then converted into progressive, the chroma upsampling error occurs. The artifact has a high frequency component in the vertical direction, which is similar to combing. As shown in FIG. 8, if it is up-sampled within a frame, such a program does not occur.

Figure 9:
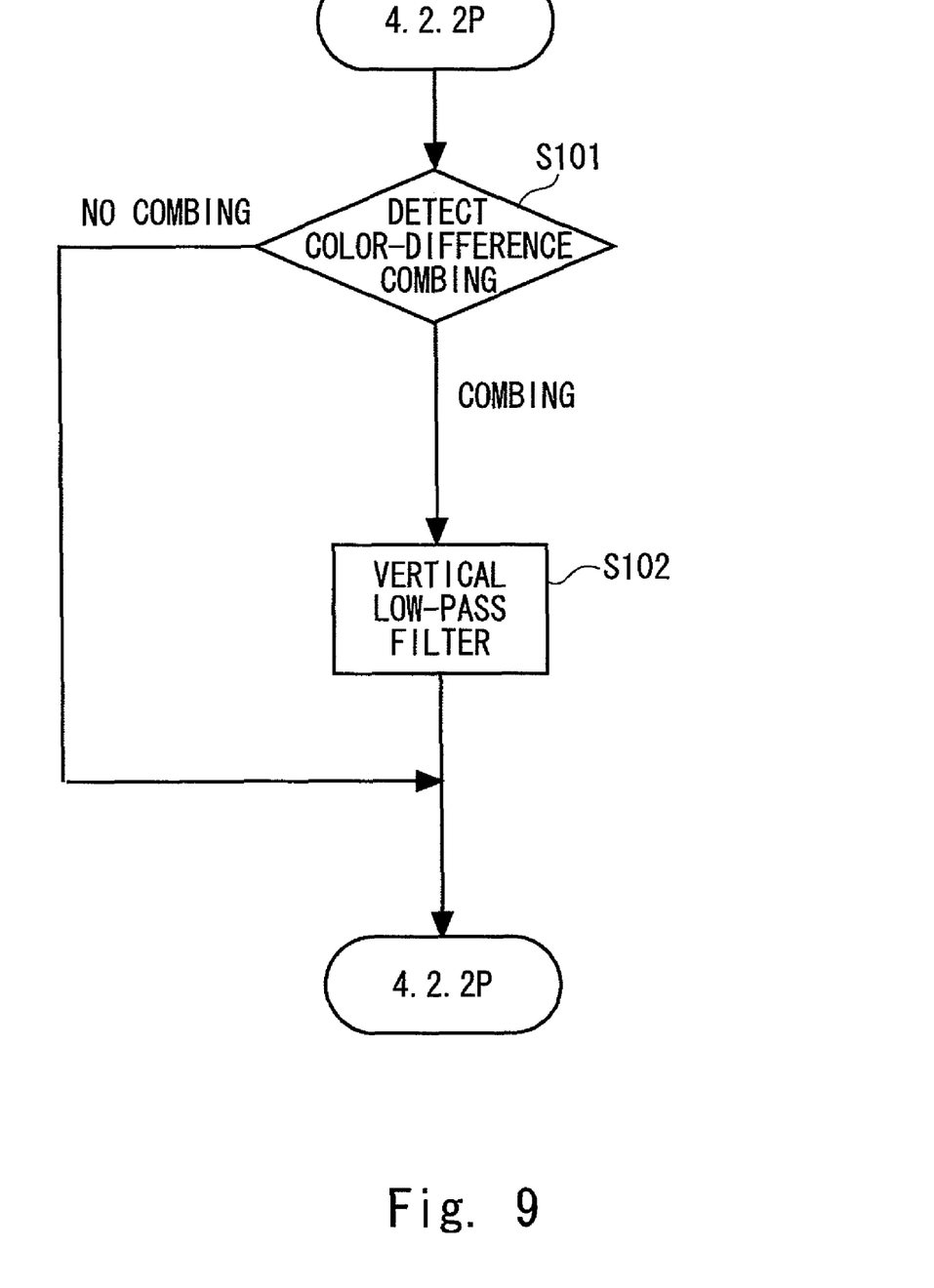
FIG. 9 is a flowchart showing a method of reducing chroma upsampling error according to related art.

FIG. 9 is a flowchart showing a chroma upsampling error reduction method according to related art. The error reduction method shown in FIG. 9, for example, has been used for such an artifact. As shown in FIG. 9, the method detects color-difference combing (step S101) and, if the color-difference combing is detected, applies a vertical low-pass filter (step S102) (cf. e.g. Published Japanese Translation of PCT International Publication for Patent Application, No. 2006-500823).

SUMMARY

However, the present inventors have found a problem that the method according to related art performs the error reduction processing on the color-difference information having an intended vertical high-frequency component, not the chroma upsampling error, in some cases. This causes a problem that the degradation of color-difference information occurs due to the error detection processing.

A first exemplary aspect of an embodiment of the present invention is an error detection method for detecting chroma upsampling error from a 4:2:2 progressive signal, which detects that chroma upsampling error is occurring if combing is absent in the luminance signal and combing is present in the color-difference signal.

A second exemplary aspect of an embodiment of the present invention is an error detection method for detecting chroma upsampling error from a 4:2:2 interlaced signal, which performs time interpolation on a luminance signal and a color-difference signal, and detects that chroma upsampling error is occurring if combing is absent in the luminance signal and combing is present in the color-difference signal.

According to the above exemplary aspects of an embodiment of the present invention, when outputting a 4:2:2 progressive signal or a 4:2:2 progressive signal generated from a 4:2:2 interlaced signal, the occurrence of the chroma upsampling error is detected if combing is absent in the luminance signal and combing is present in the color-difference signal, thereby enabling more accurate detection compared to the case of detecting the chroma upsampling error based on the detection of combing in the color-difference only.

A third exemplary aspect of an embodiment of the present invention is an error reduction method for detecting chroma upsampling error from a 4:2:2 progressive signal and reducing the error, which detects that chroma upsampling error is occurring if combing is absent in a luminance signal and combing is present in a color-difference signal, and applies a vertical low-pass filter to the color-difference signal from which the chroma upsampling error is detected.

According to the above exemplary aspect of an embodiment of the present invention, the occurrence of the chroma upsampling error is detected if combing is absent in the luminance signal and combing is present in the color-difference signal is detected, and the vertical low-pass filter is applied thereto, thereby accurately detecting and reducing the chroma upsampling error.

A fourth exemplary aspect of an embodiment of the present invention is an error reduction method for detecting chroma upsampling error from a 4:2:2 interlaced signal and reducing the error, which detects motion of a luminance signal, and performing space interpolation on the luminance signal if there is motion and performs time interpolation on the luminance signal if there is no motion; and performs space interpolation on a color-difference signal if there is motion in the luminance signal, performs space interpolation on the color-difference signal, determining that chroma upsampling error is occurring, if there is no motion in the luminance signal and combing is absent in the luminance signal and combing is present in the color-difference signal, and performs time interpolation on the color-difference signal if there is no motion in the luminance signal and the chroma upsampling error is not occurring.

According to the above exemplary aspect of an embodiment of the present invention, if there is no motion in the luminance signal and combing is absent in the luminance signal and combing is present in the color-difference signal, it is determined that the chroma upsampling error is occurring and space interpolation is performed on the color-difference signal, thereby accurately detecting and reducing the chroma upsampling error.

A fifth exemplary aspect of an embodiment of the present invention is an error reduction method for detecting chroma upsampling error from a 4:2:2 interlaced signal and reducing the error, which detects motion of a luminance signal, and performs space interpolation on the luminance signal if there is motion and performs time interpolation on the luminance signal if there is no motion; and performs space interpolation on a color-difference signal if there is motion in the luminance signal, performs time interpolation on the color-difference signal and applying a vertical low-pass filter, determining that chroma upsampling error is occurring, if there is no motion in the luminance signal and combing is absent in the luminance signal and combing is present in the color-difference signal, and performs time interpolation on the color-difference signal if there is no motion in the luminance signal and the chroma upsampling error is not occurring.

According to the above exemplary aspect of an embodiment of the present invention, if there is no motion in the luminance signal and combing is absent in the luminance signal and combing is present in the color-difference signal, it is determined that the chroma upsampling error is occurring and space interpolation is performed on the color-difference signal and then the vertical low-pass filter is applied thereto, thereby accurately detecting and reducing the chroma upsampling error.

A sixth exemplary aspect of an embodiment of the present invention is an error reduction apparatus for reducing chroma upsampling error of a 4:2:2 progressive signal, which includes a combing absence detector to detect absence of combing from a luminance signal, a combing presence detector to detect presence of combing from a color-difference signal, a vertical low-pass filter to receive the color-difference signal, and a selector to select one of the color-difference signal and a color-difference signal to which the vertical low-pass filter is applied based on detection results of the combing absence detector and the combing presence detector, and if combing is absent in the luminance signal and combing is present in the color-difference signal, the error reduction apparatus applies the vertical low-pass filter to the color-difference signal and outputs the signal.

A seventh exemplary aspect of an embodiment of the present invention is an error reduction apparatus for reducing chroma upsampling error of a 4:2:2 interlaced signal, which includes a luminance space interpolator to perform space interpolation of a luminance signal, a luminance time interpolator to perform time interpolation of the luminance signal, a motion detector to detect motion of the luminance signal, a color-difference time interpolator to perform time interpolation of a color-difference signal, a color-difference space interpolator to perform space interpolation of the color-difference signal, a combing absence detector to detect absence of combing from a result of the luminance time interpolator, a combing presence detector to detect presence of combing from a result of the color-difference time interpolator, a first selector to select one of an output of the color-difference time interpolator and an output of the color-difference space interpolator based on detection results of the combing absence detector and the combing presence detector, a second selector to select one of an output of the first selector and an output of the color-difference space interpolator based on a detection result of the motion detector, and a third selector to select one of an output of the luminance space interpolator and an output of the luminance time interpolator based on a detection result of the motion detector, and the error reduction apparatus performs space interpolation on the color-difference signal if there is motion in the luminance signal, performs space interpolation on the color-difference signal, determining that chroma upsampling error is occurring, if there is no motion in the luminance signal and combing is absent in the luminance signal and combing is present in the color-difference signal, performs time interpolation on the luminance signal if there is motion in the luminance signal and the chroma upsampling error is not occurring, and performs time interpolation on the luminance signal if there is no motion in the luminance signal, and outputs the signal.

An eighth exemplary aspect of an embodiment of the present invention is an error reduction apparatus of reducing chroma upsampling error of a 4:2:2 interlaced signal, which includes a luminance space interpolator to perform space interpolation of a luminance signal, a luminance time interpolator to perform time interpolation of the luminance signal, a motion detector to detect motion of the luminance signal, a color-difference time interpolator to perform time interpolation of a color-difference signal, a color-difference space interpolator to perform space interpolation of the color-difference signal, a vertical low-pass filter to receive a result of the color-difference time interpolator, a combing absence detector to detect absence of combing from a result of the luminance time interpolator, a combing presence detector to detect presence of combing from a result of the color-difference time interpolator, a first selector to select one of an output of the color-difference time interpolator and an output of the vertical low-pass filter based on detection results of the combing absence detector and the combing presence detector, a second selector to select one of an output of the first selector and an output of the color-difference space interpolator based on a detection result of the motion detector, and a third selector to select one of an output of the luminance space interpolator and an output of the luminance time interpolator based on a detection result of the motion detector, and the error reduction apparatus performs space interpolation on the color-difference signal if there is motion in the luminance signal, performs time interpolation on the color-difference signal and then applies the vertical low-pass filter, determining that chroma upsampling error is occurring, if there is no motion in the luminance signal and combing is absent in the luminance signal and combing is present in the color-difference signal, performs time interpolation on the color-difference signal if there is no motion in the luminance signal and the chroma upsampling error is not occurring, performs space interpolation on the luminance signal if there is motion in the luminance signal, and performs time interpolation on the luminance signal if there is no motion in the luminance signal, and outputs the signal.

According to the exemplary aspects of an embodiment of the present invention described above, it is possible to provide an error detection method and circuit and an error reduction method and circuit capable of accurately detecting and reducing chroma up-sampling error.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments of the present invention are described hereinafter in detail with reference to the drawings. In the following exemplary embodiments, the present invention is applied to a chroma upsampling error detection method that accurately detects chroma upsampling error with use of luminance information in addition to color-difference information.

First Exemplary Embodiment

Figure 1:
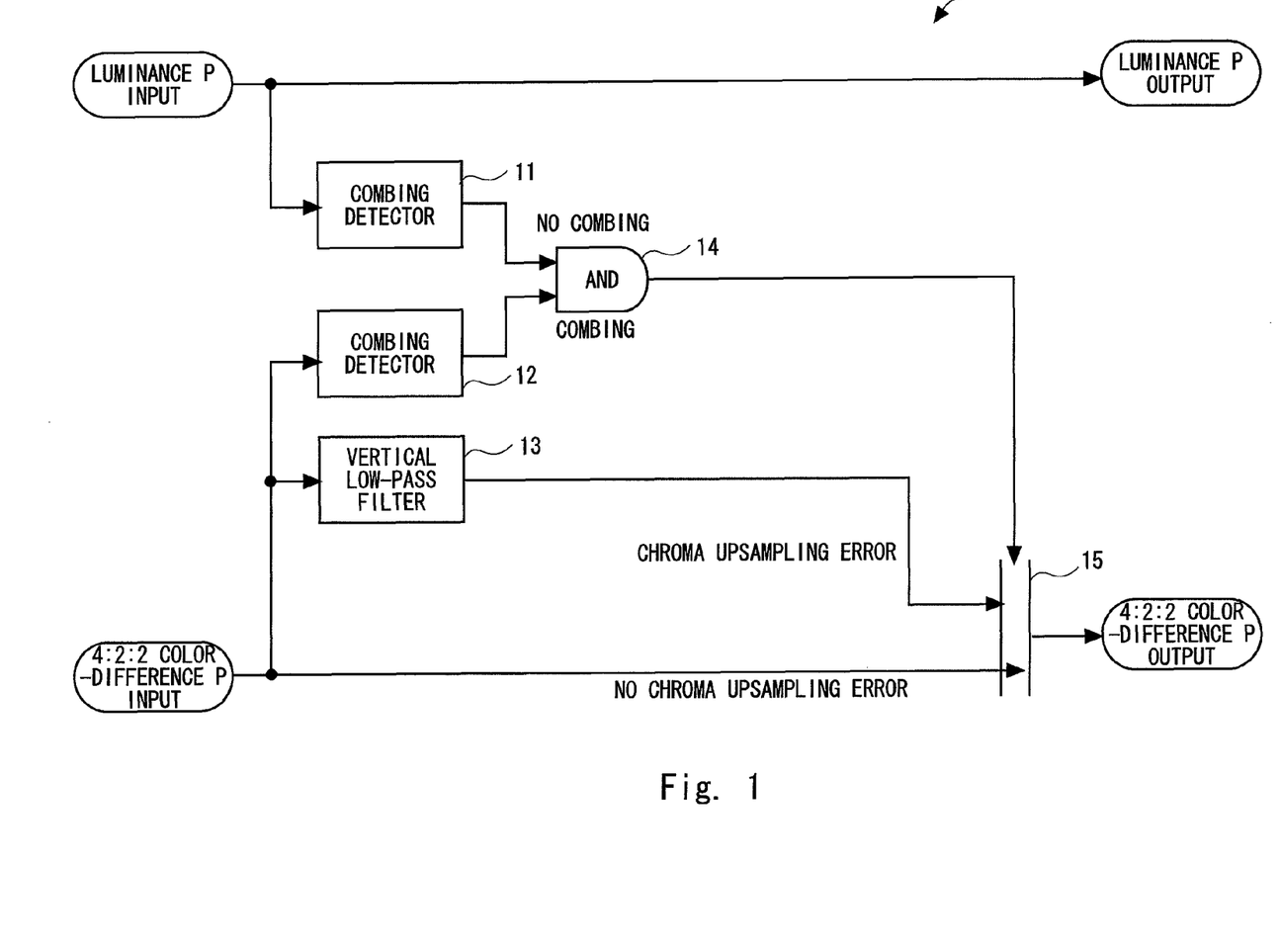
FIG. 1 is a block diagram showing an error reduction apparatus according to a first exemplary embodiment of the present invention.

FIG. 1 is a block diagram showing an error reduction apparatus according to a first exemplary embodiment of the present invention. An error reduction apparatus 1 according to the exemplary embodiment detects the chroma upsampling error from a 4:2:2 progressive signal and reduces the error. The error reduction apparatus 1 includes a combing detector 11 serving as a combing absence detector that detects the absence of combing from a luminance signal, a combing detector 12 serving as a combing presence detector that detects the presence of combing from a color-difference signal, a vertical low-pass filter 13 that receives the color-difference signal, an AND circuit 14 that outputs a selection signal based on detection results of the combing detector 11 and the combing detector 12, and a selector 15 that selects either one of the color-difference signal or a color-difference signal on which vertical low-pass filtering is performed based on the selection signal. If combing is absent in the luminance signal and combing is present in the color-difference signal, the error reduction apparatus 1 applies the vertical low-pass filter to the color-difference signal and outputs it, thereby reducing the error. The luminance signal is output as it is.

Figure 2:
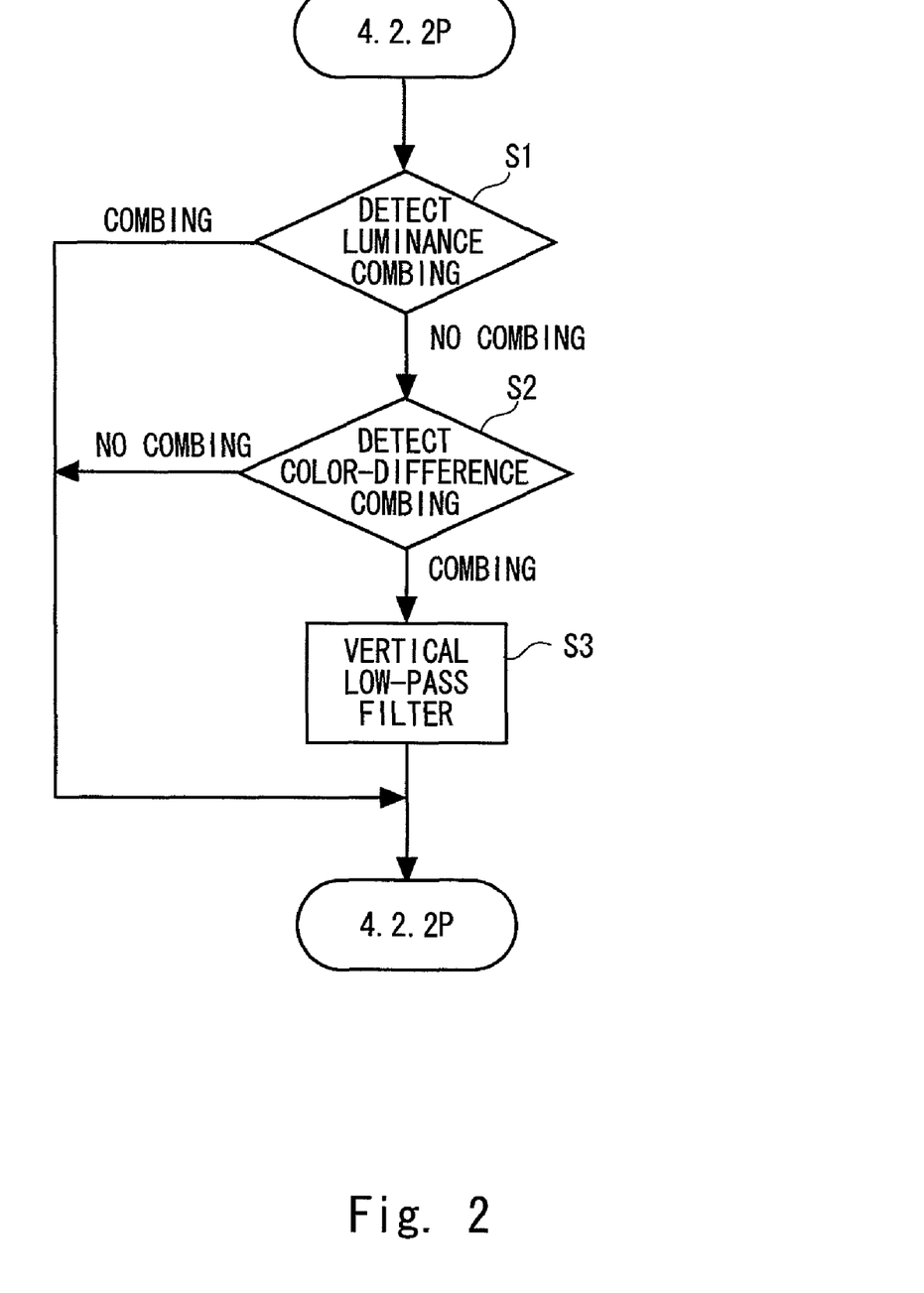
FIG. 2 is a flowchart showing the operation of the error reduction apparatus according to the first exemplary embodiment of the present invention.

FIG. 2 is a flowchart showing the operation of the error reduction apparatus 1 according to the first exemplary embodiment. Referring to FIG. 2, the combing detector 11 detects whether combing is present or absent in a luminance signal (step S1). If the combing detector 11 detects the presence of combing, it determines that it is an intended vertical high-frequency component and thus does not perform the chroma upsampling error reduction processing and outputs a color-difference signal as it is. Next, the combing detector 12 detects whether combing is present or absent in a color-difference signal (step S2). If the combing detector 12 detects the absence of combing, the error reduction apparatus 1 determines that the chroma upsampling error is not occurring and thus does not perform the chroma upsampling error reduction processing. On the other hand, if the combing detector 12 detects the presence of combing, the error reduction apparatus 1 determines that the chroma upsampling error is occurring and performs the error reduction processing. In this embodiment, the vertical low-pass filter is applied to the color-difference signal (step S3). As described earlier, the luminance signal is output as it is.

In this embodiment, because a condition that combing is absent in the luminance and combing is present in the color-difference, which is the feature of the chroma upsampling error, is used as the condition for error detection, it is possible to accurately detect the chroma upsampling error. This prevents the degradation of color-difference information by the error reduction processing.

Second Exemplary Embodiment

Figure 3:
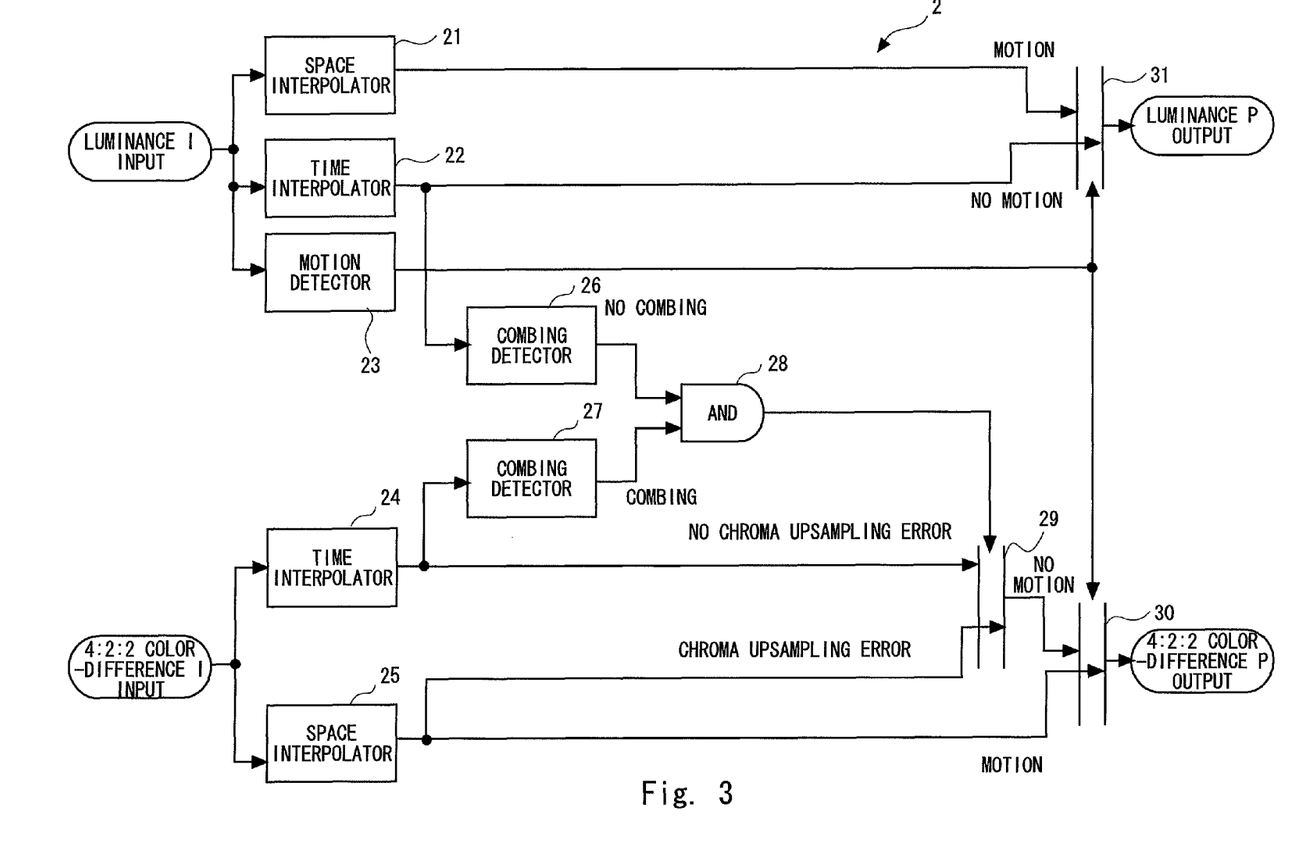
FIG. 3 is a block diagram showing an error reduction apparatus according to a second exemplary embodiment of the present invention.

FIG. 3 is a block diagram showing an error reduction apparatus according to a second exemplary embodiment of the present invention. An error reduction apparatus 2 according to the exemplary embodiment is an error reduction apparatus that converts a 4:2:2 interlaced color-difference signal, which is generated from a 4:2:0 interlaced color-difference signal by vertical upsampling, into progressive. The error reduction apparatus 2 includes a luminance space interpolator 21 that perform space interpolation of a luminance signal, a luminance time interpolator 22 that performs time interpolation of a luminance signal, a motion detector 23 that detects the motion of a luminance signal, a color-difference time interpolator 24 that performs time interpolation of a color-difference signal, and a color-difference space interpolator 25 that performs space interpolation of a color-difference signal. Further, the error reduction apparatus 2 includes a combing detector 26 serving as a combing absence detector that detects the absence of combing from a result of the luminance time interpolator 22 and a combing detector 27 serving as a combing presence detector that detects the presence of combing from a result of the color-difference time interpolator 24.

The error reduction apparatus 2 further includes an AND circuit 28 that outputs a selection signal based on detection results of the combing detector 26 and the combing detector 27, a first selector 29 that selects either one of an output of the color-difference time interpolator 24 or an output of the color-difference space interpolator 25 based on the selection signal, a second selector 30 that selects either one of an output of the first selector 29 or an output of the color-difference space interpolator 25 based on a detection result of the motion detector 23, and a third selector 31 that selects either one of an output of the luminance space interpolator 21 or an output of the luminance time interpolator 22 based on a detection result of the motion detector 23.

If there is motion in a luminance signal, the error reduction apparatus 2 performs space interpolation on the color-difference signal. If there is no motion in the luminance signal, and combing is absent in the luminance signal and combing is present in the color-difference signal, the error reduction apparatus 2 determines that the chroma upsampling error is occurring and thus performs the error reduction processing. Specifically, it performs space interpolation on the color-difference signal. Further, if there is no motion in the luminance signal and the chroma upsampling error is not occurring, the error reduction apparatus 2 performs time interpolation on the color-difference signal. If there is motion in the luminance signal, the error reduction apparatus 2 performs space interpolation on the luminance signal, and if there is no motion in the luminance signal, it performs time interpolation on the luminance signal and then outputs the signal.

The motion detector 23 determines that there is motion if a certain degree of change occurs in the luminance signal between frames. The space interpolators 21 and 25 perform interpolation within a frame. The time interpolators 22 and 24 perform interpolation between frames. The AND circuit 28 outputs High if the combing detector 26 detects the absence of combing and the combing detector 27 detects the presence of combing, and the first selector 29 selects an output of the space interpolator 25. If the motion detector 23 detects the motion, the second selector 30 selects an output of the space interpolator 25. Likewise, the third selector 31 selects an output of the space interpolator 21.

Figure 4:
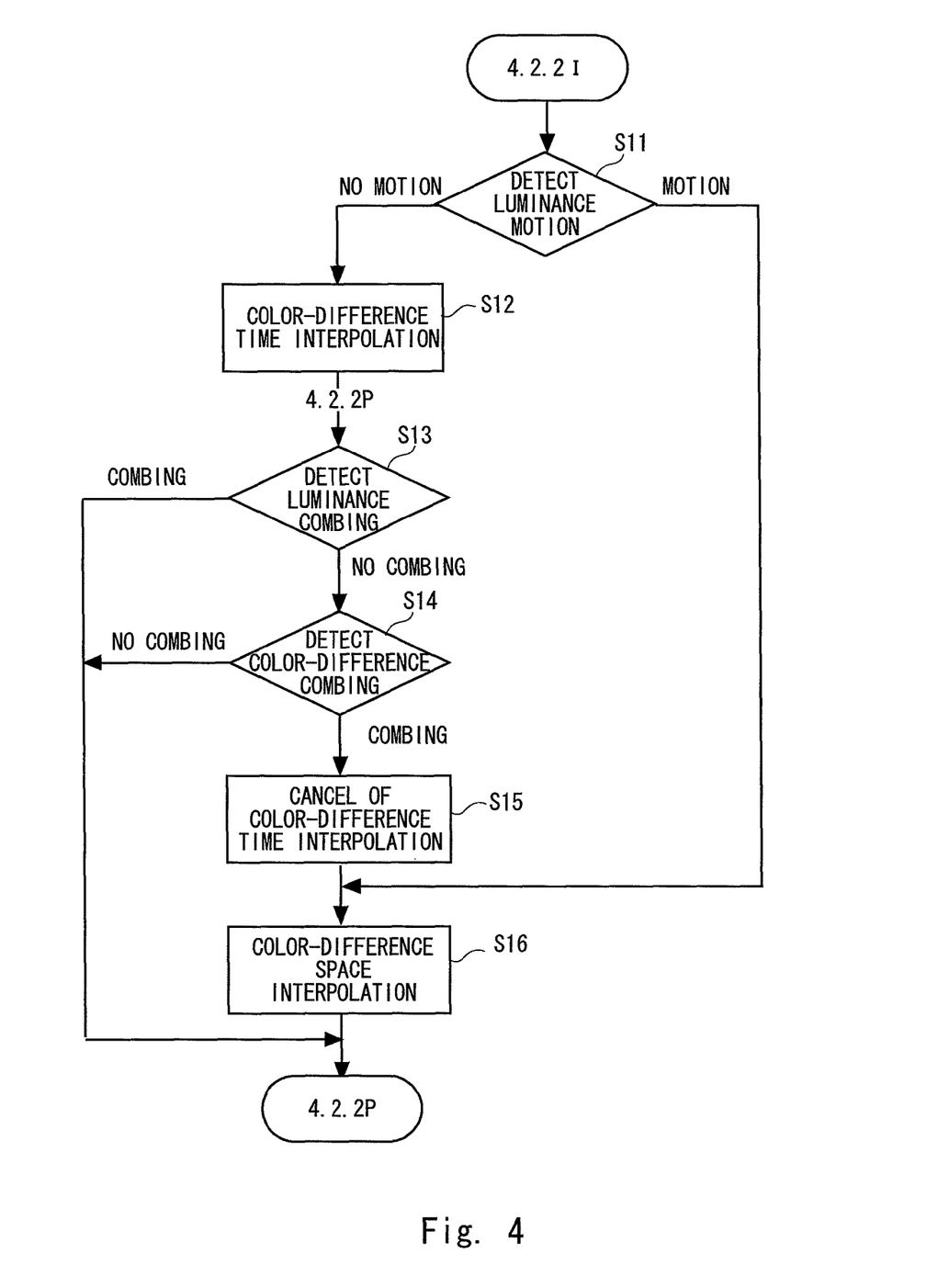
FIG. 4 is a flowchart showing the operation of the error reduction apparatus according to the second exemplary embodiment of the present invention.

FIG. 4 is a flowchart showing the operation of the error reduction apparatus 2 according to the second exemplary embodiment. Referring to FIG. 4, first, the motion detector 23 detects the motion of a luminance signal (step S11). If it is determined that there is no motion, the time interpolator 24 performs time interpolation of a color-difference signal (step S12). Next, the combing detector 26 determines whether combing is present in the luminance signal (step S13). If the combing detector 26 detects the presence of combing, the error reduction apparatus 2 determines that it is an intended vertical high-frequency component and therefore does not perform the chroma upsampling error reduction processing. Then, the combing detector 27 determines whether combing is present in the color-difference signal (step S14). If the combing detector 27 detects the absence of combing, the error reduction apparatus 2 determines that the chroma upsampling error is not occurring and therefore does not perform the chroma upsampling error reduction processing. On the other hand, if the combing detector 27 detects the presence of combing, the error reduction apparatus 2 determines that the chroma upsampling error is occurring and therefore performs the reduction processing. Specifically, time interpolation of the color-difference signal is cancelled (step S15), and space interpolation of the color-difference signal is performed (step S16). Although the case of canceling the color-difference time interpolation is described in this exemplary embodiment, it is feasible to perform both time interpolation and space interpolation for the color-difference signal and select either one according to the results of the combing detectors 26 and 27 as shown in FIG. 3.

In this exemplary embodiment, because a condition that combing is absent in the luminance and combing is present in the color-difference, which is the feature of the chroma upsampling error, is used as the condition for error detection, it is possible to accurately detect the chroma upsampling error. This prevents the degradation of color-difference information by the error reduction processing.

Third Exemplary Embodiment

Figure 5:
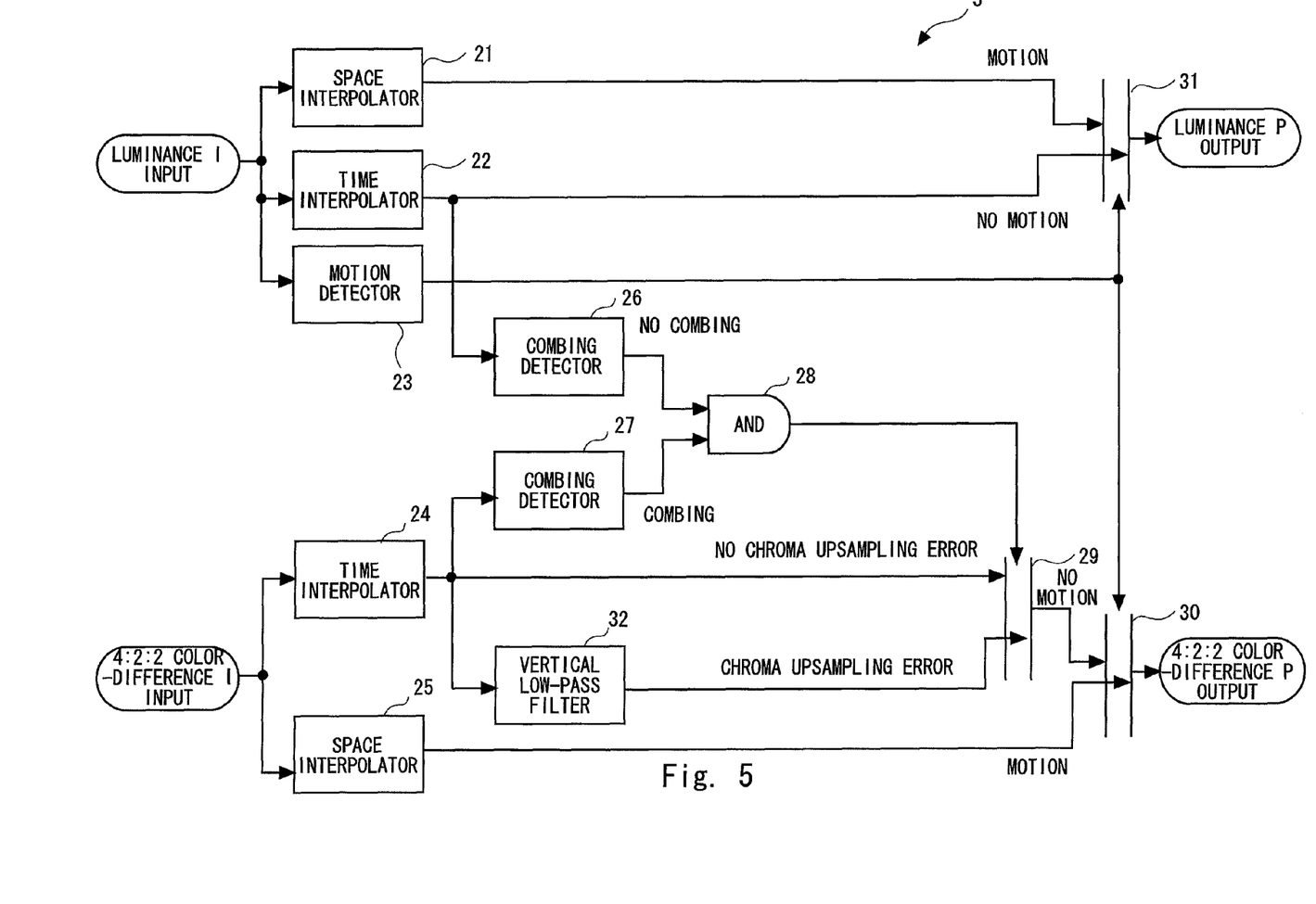
FIG. 5 is a block diagram showing an error reduction apparatus according to a third exemplary embodiment of the present invention.

FIG. 5 is a block diagram showing an error reduction apparatus according to a third exemplary embodiment of the present invention. An error reduction apparatus 3 according to the exemplary embodiment is an error reduction apparatus that reduces the chroma upsampling error of a 4:2:2 interlaced signal and outputs a 4:2:2 progressive signal. In the third exemplary embodiment shown in FIG. 5, the same elements as those of the second exemplary embodiment shown in FIG. 3 are denoted by the same reference symbols and detailed description is omitted. The error reduction apparatus 3 according to the exemplary embodiment includes a vertical low-pass filter 32 that receives a result of the color-difference time interpolator 24. The first selector 29 selects either one of an output of the time interpolator 24 or an output of the vertical low-pass filter 32 based on a selection signal output from the AND circuit 28 and outputs the selected one. The second selector 30 selects either one of an output of the first selector 29 or an output of the space interpolator 25 based on a motion detection result of the motion detector 23 and outputs the selected one.

If there is motion in the luminance signal, the error reduction apparatus 3 performs space interpolation on the color-difference signal. If there is no motion in the luminance signal, and combing is absent in the luminance signal and combing is present in the color-difference signal, the error reduction apparatus 3 determines that the chroma upsampling error is occurring and thus performs the error reduction processing. Specifically, it performs time interpolation on the color-difference signal and then applies the vertical low-pass filter. Further, if there is no motion in the luminance signal and the chroma upsampling error is not occurring, the error reduction apparatus 3 performs time interpolation on the color-difference signal. If there is motion in the luminance signal, the error reduction apparatus 3 performs space interpolation on the luminance signal, and if there is no motion in the luminance signal, it performs time interpolation on the luminance signal and then outputs the signal.

Figure 6:
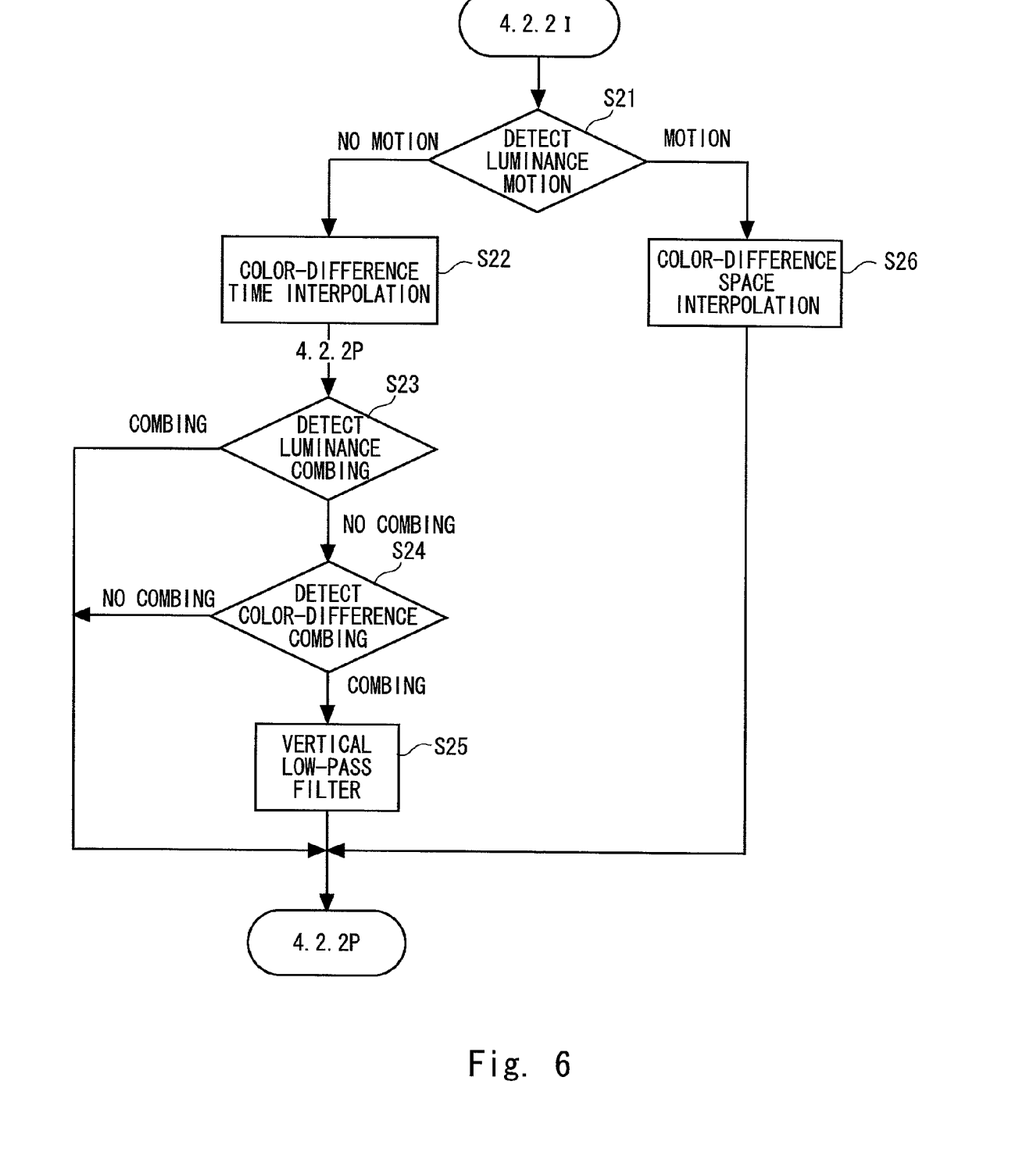
FIG. 6 is a flowchart showing the operation of the error reduction apparatus according to the third exemplary embodiment of the present invention.

FIG. 6 is a flowchart showing the operation of the error reduction apparatus 3 according to the third exemplary embodiment. As shown in FIG. 6, first, the motion detector 23 detects the motion of a luminance signal (step S21). If there is no motion, time interpolation is performed on a color-difference signal (step S22). Next, it is determined whether combing is present in the luminance signal (step S23). If combing is present, it is determined that the chroma upsampling error is not occurring, and therefore the chroma upsampling error reduction processing is not performed. Then, it is determined whether combing is present in the color-difference signal (step S24). If combing is absent, it is determined that it is an intended vertical high-frequency component, and therefore the chroma upsampling error reduction processing is not performed.

On the other hand, if combing is present, it is determined that the chroma upsampling error is occurring, and therefore the chroma upsampling error reduction processing is performed. In this processing, the vertical low-pass filter is applied, for example (step S25). Error detection and reduction is performed with respect to each pixel, so that the error detection processing is applied only to a desired pixel. Although the chroma upsampling error reduction processing is executed by applying the low-pass filter vertically in this exemplary embodiment, the error reduction processing may be executed by a method different from the low-pass filter.

If it is determined that there is motion in the luminance signal, space interpolation is performed on the color-difference signal (step S26). For the luminance signal, space interpolation is performed if it is determined that there is motion, and time interpolation is performed if it is determined that there is no motion.

In this exemplary embodiment, because a condition that combing is absent in the luminance and combing is present in the color-difference, which is the feature of the chroma upsampling error, is used as the condition for error detection, it is possible to accurately detect the chroma upsampling error. This prevents the degradation of color-difference information by the error reduction processing.

The first, second and third exemplary embodiments can be combined as desirable by one of ordinary skill in the art.

Further, the present invention is not limited to the above-described exemplary embodiments, and various changes may be made without departing from the scope of the invention.

For example, although the above elements are described as being hardware components in the above-described exemplary embodiments, the present invention is not limited thereto, and arbitrary processing may be implemented by causing a central processing unit (CPU) to execute a computer program. In this case, the computer program may be provided by being recorded in a recording medium or transmitted through a transmission medium such as the Internet.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An error reduction method for detecting chroma upsampling error from a 4:2:2 progressive signal and reducing the error, comprising:

detecting that chroma upsampling error is occurring if combing is absent in a luminance signal and combing is present in a color-difference signal;

applying a vertical low-pass filter to the color-difference signal;

selecting one of the color-difference signal and the color-difference signal to which the vertical low-pass filter is applied based on presence or absence of combing of the luminance signal and the color-difference signal; and applying the vertical low-pass filter to the color-difference signal and outputs the signal if the chroma upsampling error is occurring.

2. An error reduction method for detecting chroma upsampling error from a 4:2:2 interlaced signal and reducing the error, comprising:

detecting motion of a luminance signal, and performing space interpolation on the luminance signal if there is motion and performing time interpolation on the luminance signal if there is no motion; and performing space interpolation on a color-difference signal if there is motion in the luminance signal, performing space interpolation on the color-difference signal, determining that chroma upsampling error is occurring, if there is no motion in the luminance signal and combing is absent in the luminance signal and combing is present in the color-difference signal, and performing time interpolation on the color-difference signal if there is no motion in the luminance signal and the chroma upsampling error is not occurring.

3. An error reduction method for detecting chroma upsampling error from a 4:2:2 interlaced signal and reducing the error, comprising:

detecting motion of a luminance signal, and performing space interpolation on the luminance signal if there is motion and performing time interpolation on the luminance signal if there is no motion; and performing space interpolation on a color-difference signal if there is motion in the luminance signal, performing time interpolation on the color-difference signal and applying a vertical low-pass filter, determining that chroma upsampling error is occurring, if there is no motion in the luminance signal and combing is absent in the luminance signal and combing is present in the color-difference signal, and performing time interpolation on the color-difference signal if there is no motion in the luminance signal and the chroma upsampling error is not occurring.

4. An error reduction apparatus for reducing chroma upsampling error of a 4:2:2 progressive signal, comprising:

a combing absence detector to detect absence of combing from a luminance signal;

a combing presence detector to detect presence of combing from a color-difference signal;

a vertical low-pass filter to receive the color-difference signal; and a selector to select one of the color-difference signal and a color-difference signal to which the vertical low-pass filter is applied based on detection results of the combing absence detector and the combing presence detector, wherein if combing is absent in the luminance signal and combing is present in the color-difference signal, the error reduction apparatus applies the vertical low-pass filter to the color-difference signal and outputs the signal.

5. An error reduction apparatus for reducing chroma upsampling error of a 4:2:2 interlaced signal, comprising:

a luminance space interpolator to perform space interpolation of a luminance signal;

a luminance time interpolator to perform time interpolation of the luminance signal;

a motion detector to detect motion of the luminance signal;

a color-difference time interpolator to perform time interpolation of a color-difference signal;

a color-difference space interpolator to perform space interpolation of the color-difference signal;

a combing absence detector to detect absence of combing from a result of the luminance time interpolator;

a combing presence detector to detect presence of combing from a result of the color-difference time interpolator;

a first selector to select one of an output of the color-difference time interpolator and an output of the color-difference space interpolator based on detection results of the combing absence detector and the combing presence detector;

a second selector to select one of an output of the first selector and an output of the color-difference space interpolator based on a detection result of the motion detector; and a third selector to select one of an output of the luminance space interpolator and an output of the luminance time interpolator based on a detection result of the motion detector, wherein the error reduction apparatus performs space interpolation on the color-difference signal if there is motion in the luminance signal, performs space interpolation on the color-difference signal, determining that chroma upsampling error is occurring, if there is no motion in the luminance signal and combing is absent in the luminance signal and combing is present in the color-difference signal, performs time interpolation on the color-difference signal if there is no motion in the luminance signal and the chroma upsampling error is not occurring, and performs time interpolation on the luminance signal if there is no motion in the luminance signal, and outputs the signal.

6. An error reduction apparatus of reducing chroma upsampling error of a 4:2:2 interlaced signal, comprising:

a luminance space interpolator to perform space interpolation of a luminance signal;

a luminance time interpolator to perform time interpolation of the luminance signal;

a motion detector to detect motion of the luminance signal;

a color-difference time interpolator to perform time interpolation of a color-difference signal;

a color-difference space interpolator to perform space interpolation of the color-difference signal;

a vertical low-pass filter to receive a result of the color-difference time interpolator;

a combing absence detector to detect absence of combing from a result of the luminance time interpolator;

a combing presence detector to detect presence of combing from a result of the color-difference time interpolator;

a first selector to select one of an output of the color-difference time interpolator and an output of the vertical low-pass filter based on detection results of the combing absence detector and the combing presence detector;

a second selector to select one of an output of the first selector and an output of the color-difference space interpolator based on a detection result of the motion detector; and a third selector to select one of an output of the luminance space interpolator and an output of the luminance time interpolator based on a detection result of the motion detector, wherein the error reduction apparatus performs space interpolation on the color-difference signal if there is motion in the luminance signal, performs time interpolation on the color-difference signal and then applies the vertical low-pass filter, determining that chroma upsampling error is occurring, if there is no motion in the luminance signal and combing is absent in the luminance signal and combing is present in the color-difference signal, performs time interpolation on the color-difference signal if there is no motion in the luminance signal and the chroma upsampling error is not occurring, performs space interpolation on the luminance signal if there is motion in the luminance signal, and performs time interpolation on the luminance signal if there is no motion in the luminance signal, and outputs the signal.

* * * * *